United States Patent [19]

Brander

[11] 4,456,094
[45] Jun. 26, 1984

[54] COMBI-EQUIPMENT

[76] Inventor: Hans I. Brander, Talbystrand, Södertälje, Sweden, S-151 50

[21] Appl. No.: 403,513

[22] PCT Filed: Nov. 9, 1981

[86] PCT No.: PCT/SE81/00327
    § 371 Date: Jul. 8, 1982
    § 102(e) Date: Jul. 8, 1982

[87] PCT Pub. No.: WO82/01692
    PCT Pub. Date: May 27, 1982

[30] Foreign Application Priority Data

Nov. 10, 1980 [SE] Sweden .................. 8007868

[51] Int. Cl.³ .................................... B62B 1/20
[52] U.S. Cl. .................................... 182/20; 182/129; 280/30; 280/47.18
[58] Field of Search .................. 182/20–26, 182/150, 206, 116, 129; 280/654, 30, 47.27, 47.18, 47.17, 47.19, 47.34

[56] References Cited

U.S. PATENT DOCUMENTS

| | | | |
|---|---|---|---|
| 2,843,393 | 7/1958 | Dahlander, Sr. | |
| 2,957,700 | 10/1960 | Beaurline | 280/654 |
| 3,104,889 | 9/1963 | Branch | 182/20 |
| 3,797,847 | 3/1974 | Lindsey | 280/654 |
| 4,040,642 | 8/1977 | David | 280/654 |
| 4,248,453 | 2/1981 | Stark | 280/47.17 |
| 4,355,818 | 10/1982 | Watts | 280/654 |

FOREIGN PATENT DOCUMENTS

| | | |
|---|---|---|
| 2205501 | 8/1973 | Denmark. |
| 2118290 | 7/1972 | France. |
| 636141 | 4/1950 | United Kingdom. |
| 1288251 | 1/1970 | United Kingdom. |

*Primary Examiner*—R. P. Machado
*Assistant Examiner*—Alvin Chin-Shue
*Attorney, Agent, or Firm*—Brumbaugh, Graves, Donohue & Raymond

[57] ABSTRACT

Combi-equipment functioning as transport cart and ladder, particularly boat-ladder, said equipment comprising a main frame (1) supported by wheels (9, 10) and a load-carrying member, said main frame comprising two elongate, substantially parallel side frame pieces (2, 3) and upper and lower end frame pieces (4, 5), joining the side frame pieces, as well as a number of transverse stays between the side frame parts.

The equipment according to the invention is characterized in that the load-carrying member comprises a load-carrying frame (13) pivotably journalled on a transverse stay (8) or on the side frame parts, and a support frame (21) which is pivotably journalled on the load-carrying frame (13), that the support frame (21) is provided with locking means (25) designed to be brought into engagement with either the lower end frame part (5) of the main frame to give a first position of the load-carrying member, or with a second transverse stay (7) of the main frame part, said stay being located above and at a predetermined distance from said first transverse stay (8), to give a second position of the load-carrying member.

4 Claims, 10 Drawing Figures

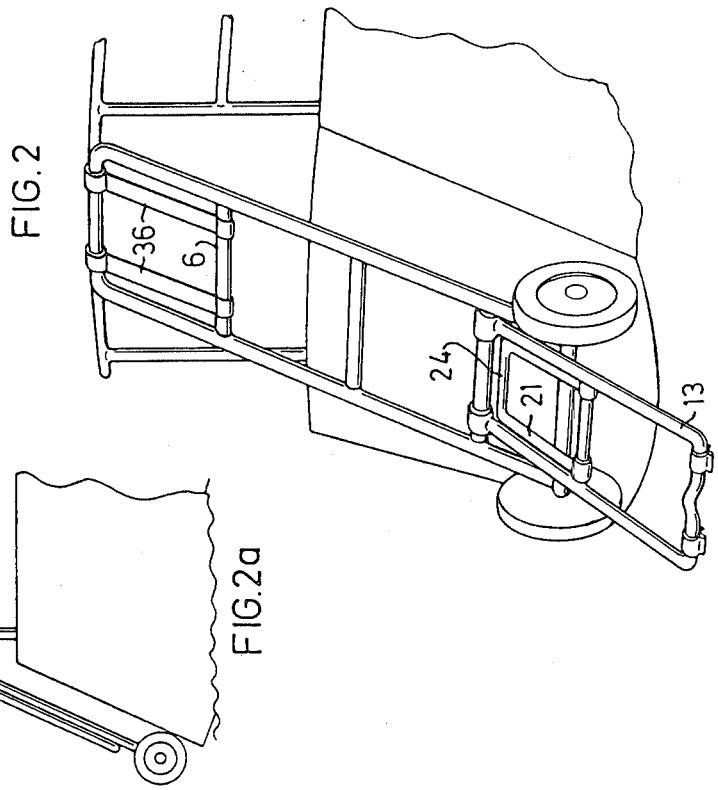
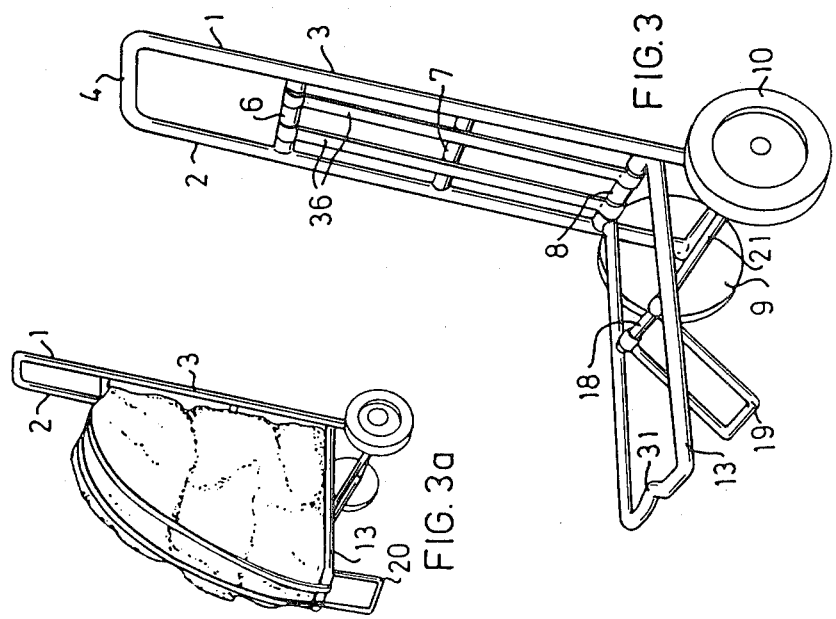

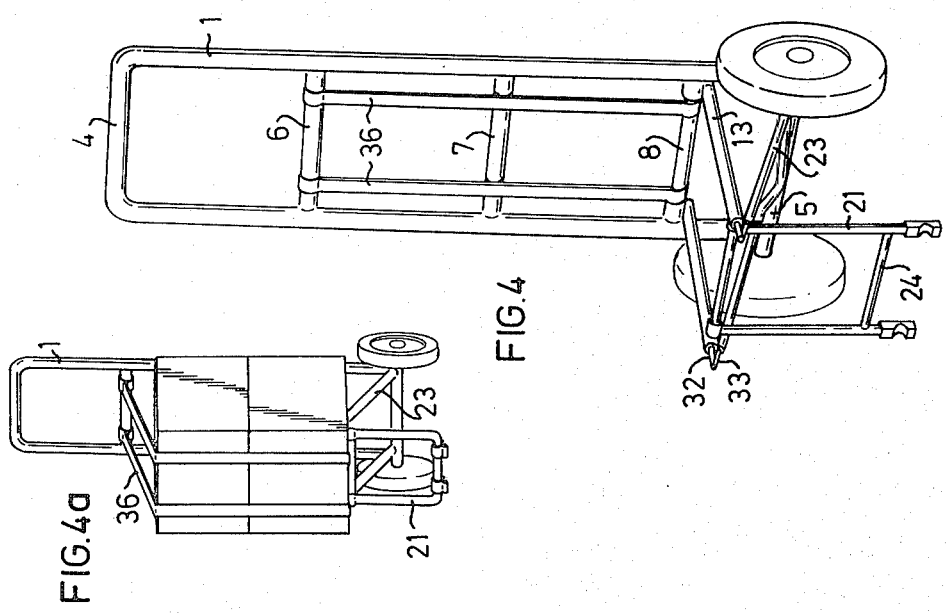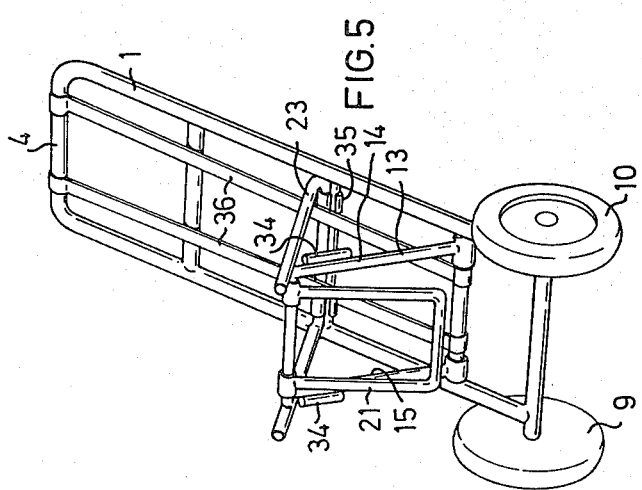

COMBI-EQUIPMENT

BACKGROUND OF THE INVENTION

The present invention relates to a combi-equipment functioning as transport cart and ladder, particularly boat-ladder, said equipment comprising a main frame supported by wheels, and a load-carrying member, said main frame comprising two elongate, substantially parallel side frame pieces and upper and lower end frame pieces joining the side frame pieces, as well as a number of transverse stays between the side frame parts.

Equipment of the type mentioned above is known per se through U.S. Pat. Ser. No. 2,843,393, British Pat. No. 636,141 and German Offenlegungsschrift No. 2,205,501, for instance. All these utensils can be used for various limited purposes.

SUMMARY OF THE INVENTION

The object of the present invention is to provide equipment of the type mentioned which can be used for considerably more purposes than previously known equipment, by means of a quick and simple conversion.

Another object of the present invention is to provide equipment which is simple in design, weighs little, but is still sufficiently stable to fulfil its various tasks.

Yet another object of the present invention is to provide equipment to which accessories can easily be applied, thus further increasing the usefulness of the equipment.

The objects listed above are achieved according to the present invention by giving the equipment the characteristics defined in the claims.

Since the load-carrying member, comprising a load-carrying frame pivotably journalled on a transverse stay or on the side frame parts, and support frame which is pivotably journalled in conjunction with the load-carrying frame, this enables the support frame, with the help of locking members, to be brought into engagement either with the lower end frame part of the main frame to give a first position of the load-carrying member, or with a second transverse stay of the main frame part, said stay being located above said first transverse stay, to give a second position of the load-carrying member.

The load-carrying frame may also be designed to comprise an outer part, jointed in relation to an inner part of the load-carrying member, arranged to be locked in relation to the frame part to provide an extended load plane or extended support member.

The outer part of the frame part may also be provided with locking means which, after the locking engagement of the outer part with the load-carrying frame has been released, can be brought into engagement with the lower end frame part of the main frame, so that yet another position for the load-carrying member is obtained.

The load-carrying frame may also be designed to abut against the lower end frame part of the main frame, whereupon the outer part of the load-carrying frame is arranged via a means preventing further turning, to assume a perpendicular position in relation to the load-carrying frame, the outer part of the load-carrying frame serving as a support on the ground.

The present invention is particularly useful as an accessory for leisure boats to fulfil the double function of facilitating climbing ashore or aboard over the bow, for instance, and serving as a transport cart for goods to be transported to and from the boat.

BRIEF DESCRIPTION OF THE DRAWINGS

The invention will now be described with reference to various preferred embodiments shown in the accompanying sheet of drawings, in which FIGS. 2 and 2a show the equipment in a position enabling it to be used as a stern ladder with a folding lower part folded down and up, respectively.

FIGS. 3 and 3a show the equipment in a position for use as a transport cart with maximum load plane, FIGS. 4 and 4a show alternative embodiments of the equipment with pivotably jointed load-carrying frames where only the inner section of the load-carrying frame is used for carrying loads, FIG. 5 shows an alternative embodiment of the equipment in a position enabling it to be used as a small, raised load plane.

DETAILED DESCRIPTION OF THE PREFERRED EMBODIMENT

Figure 1:
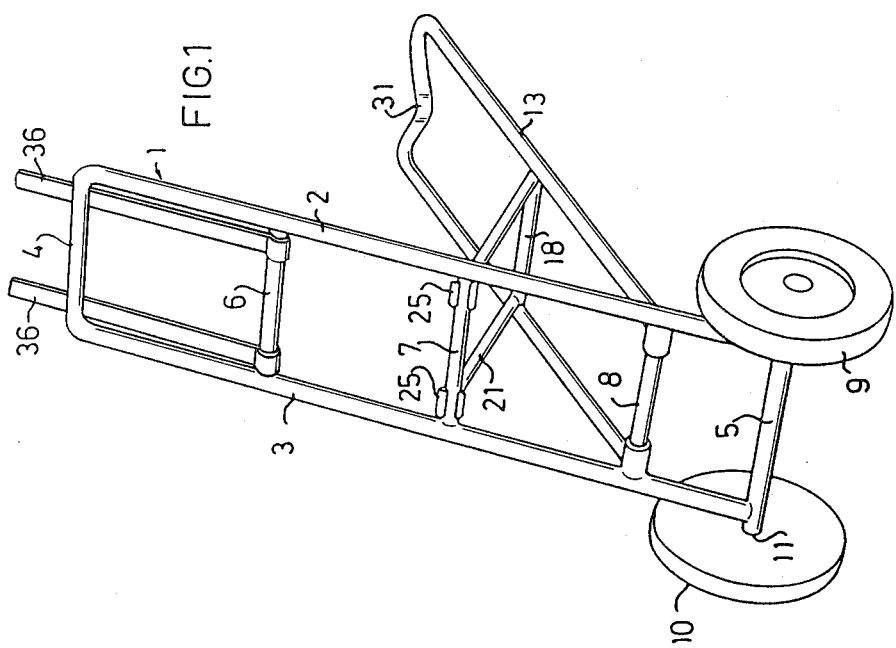
FIGS. 1 and 1a show the equipment in a position enabling it to be used as a bow ladder.

The equipment shown in FIGS. 1-3 comprises a flat, retangular main frame 1 composed of two parallel side frame pieces 2, 3, an upper end frame piece 4 and a lower end frame piece 5. The main frame is provided with an upper transverse stay 6, an intermediate transverse stay 7 and a lower transverse stay 8, said transverse stays being arranged at predetermined distances from the lower end frame piece 5 of the main frame. The main frame is supported by two wheels 9, 10 running outside the side frame parts 2,3 and journalled on pins 11 formed by extensions on each side of the lower end frame part 5.

The main frame part 1 is provided with a load-carrying and support-forming member, termed load-carrying frame 13 in the following. This load-carrying frame 13 is provided with two parallel bars 14, 15, which are pivotably jointed on the lower transverse stay 8 by means of two bearing sleeves to which the bars are secured to form a right angle to their turning axis. Of course, the load-carrying frame 13 can also be pivotably attached in the main frame 1 via ears in the main frame protruding from the side facing the load-carrying frame. The load-carrying frame 13 is also provided with a transverse bar 18 which in turn is provided with a support frame 21 pivoted thereon. A transverse piece 24 (FIG. 2) may be included in the support frame 21 and this transverse piece 24 or the free ends of the support frame 21 may be provided with locking means or support feet 25 in the form of clamps. The transverse stay 18 may also be included as an integral part of the support frame 21, this part being pivotably attached between the parallel bars 14 and 15 of the load-carrying frame 13. The locking member 25 can be fixed to the intermediate transverse stay 7 (FIG. 1) or to the lower end frame part 5 (FIG. 3) to offer various positions of the load-carrying frame and thus also various uses for the equipment.

Figure 6:
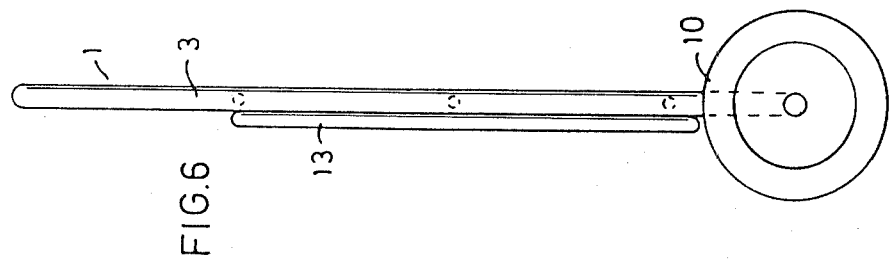
FIG. 6 shows a side view of the equipment according to the invention when folded.

The locking means 25 on the support frame 21 can also be arranged to lock the load-carrying frame 13 in a fully folded position close to the main frame (FIG. 6). In this position the locking means cooperate with the transverse stay 8.

Figure 1A:
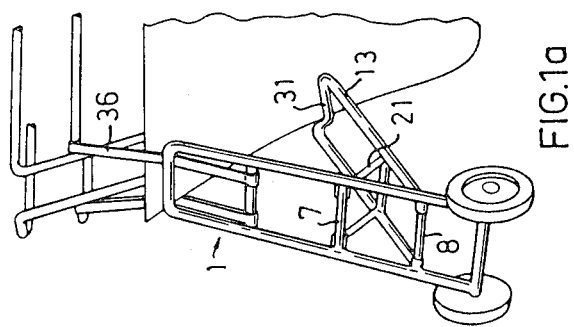

The straps 36 shown in FIGS. 1 and 3 can be used for hanging up the equipment when being used as a bow ladder (FIG. 1a) or to restrain bulky goods (FIG. 3a).

To facilitate use as a bow ladder, the load-carrying frame 13 is preferably provided with an inward depression 31 to fit the bow part of the hull, thus preventing the equipment from slipping on the hull when the load-carrying frame 13 is subjected to stress caused by a person boarding the boat.

FIGS. 3 and 3a show two different types of parking supports, one of which comprises a bracket 19 arranged around the transverse stay 18, which can be turned to a stop in the position shown in FIG. 3 and the other a bracket 20 located pivotably at the front end of the load-carrying frame 13, this bracket also being limited by a stop to the position shown in FIG. 3a.

FIGS. 4 and 5 show alternative embodiments of the equipment in which the load-carrying frame 13 is jointed, i.e. it is provided with an outer frame piece 23 which is jointed about the transverse stay 18 of the load-carrying frame 13. This permits additonal functions such as that shown in FIG. 4 with a low load plane on the inner portion of the load-carrying frame 13 formed by folding down the frame piece 23 for attachment to the end frame part 5. This is the position shown in FIGS. 4 and 4a. It also permits the use of a raised, but limited load plane (FIG. 5).

The outer part 23 of the load-carrying frame is thus arranged to be locked in the load-carrying frame 13 to form the previously mentioned extended load plane (shown in FIGS. 1–3). The locking and positioning between parts 23 and 13 can be achieved in several ways. FIG. 4 shows one alternative in which the load-carrying frame 13 receives dowels 32 projecting under spring influence, the free ends of which are jointed and support permanent dowels 33 on the part 23, said dowels being drawn by spring action into the bars 14 and 15 of the load-carrying frame in order to lock the part 23 to the load-carrying frame 13 and to form the extenddd load plane.

FIG. 5 shows a different arrangement to achieve locking between the inner and outer parts of the load-carrying frame. This arrangement comprises a sleeve 34 located on the outside of each bar 14, 15 hnd having a spring-influenced locking dowel (not shown in FIG. 5) protruding therefrom. The locking dowels in each sleeve are arranged to be inserted under spring force into the respective sleeves 34 and when the load-carrying frames are on the same plane, i.e. when the outer frame part 23 has been swung to a position in which it is parallel to the bars 14, 15, the locking dowels can be released and accepted in hollows in the end parts of the load-carrying frame in order to achieve locking engagement.

The cross-piece of the frame part 23 is provided with locking members such as locking brackets 35, by means of which, after being swung around its axis, the outer load-carrying frame can be retained at either the lower end frame part of the main frame to be used for some purpose, or at the intermediate transverse stay of the main frame for a different purpose, to be described below.

This locking bracket or other form of locking means can be used to secure the two connected load-carrying frames to the main frame in folded position, the brackets being designed to be brought into engagement with the upper transverse stay. The wheels 9, 10, arranged on the main frame 1, are preferably of plastic and easily removable from the main frame, by means of an easily removable cotter ping which keeps the wheels in position on the main frame in assembled position. At least one groove may be arranged around the running periphery of the wheel, in which a ring of homogeneous rubber, for instance, is fitted. This ring enables smooth and quiet running on a hard surface and sinks down easily into a soft surface so that the entire width of the running surface on the wheel is used to give sufficient support.

Various ways of assembling the equipment and fields of application will be suggested in the following:

1. Bow ladder (FIG. 1)

By securing the support frame 21 to the transverse stay 7 of the main frame with clamps 25, the load-carrying frame 13 can be used as a support against the bow of a leisure craft, the equipment having been suspended in the bow pulpit, railing or the like by the straps 36. The inward depression 31 in the outer transverse stay of the load-carrying frame offers improved lateral stability.

2. Bathing ladder (FIG. 2)

It the load-carrying frame 13 is folded down to hand against the lower end frame part 5 of the main frame, an arrangement suspended by the straps 36 with the wheels 9, 10 as supports against the stern or hull side can function as a bathing ladder, the cross-pieces acting as rungs on the ladder.

3. Transport cart with large load plane (FIG. 3)

If the clamps 25 outermost on the support frame 21 are applied on the lower end frame part 5 of the main frame 1, a relatively large load plane will be formed which is suitable for relatively light and bulky goods. The two straps 36 can then be used to hold the goods against the load-carrying frame and the main frame.

4. Transport cart with small, low load plane (FIG. 4)

In one embodiment of the equipment according to the invention, in which the load-carrying frame 13 is jointed, the outer frame part 23 can be folded down to rest against the side frame parts 2, 3 of the main frame and the lower end frame part 5. The inner, load-carrying frame part 13 then forms a load plane which is directed at right angles to the main frame. If the support frame 21 is then placed parallel to the main frame the attachment member (not shown) on the outer frame part 23 can be locked to the lower end frame part 5 of the main frame, which means that the equipment can be parked erect either with or without load. This position also permits a pack-bag to be hung from one or more of the transverse stays of the main frame.

5. Transport cart with slightly higher load plane (FIG. 5)

The use of locking brackets enables the frame part 23 to be secured to the intermediate transverse stay 7, thus forming the smaller, raised load plane. The equipment can then be used for transporting goods requiring some distance to the ground, or as a provisional measure for transporting handicapped persons, for instance, or possibly as a child's pushchair, in which case the support frame serves as a foot rest.

6. Collapsed (FIG. 6)

When folded together the equipment according to the invention takes a minimum of space since both load-carrying frame and support frame lie parallel, close to the main frame. In this position too, locking brackets on an outer frame part can be used to secure the load-carrying frame to the upper cross-piece 6 of the main frame.

The invention is not limited to the embodiments described above by way of example. Modifications are feasible within the frame of the following claims.

I claim:

1. Combi-equipment functioning as transport cart and ladder, particularly boat-ladder, said equipment comprising a main frame supported by wheels and a load-carrying member, said main frame comprising two elongate, substantially parallel side frame pieces and upper and lower end frame pieces, joining the side frame pieces, as well as a number of transverse stays between the side frame parts, characterised in that the load-carrying member comprises a load-carrying frame pivotably journalled on a transverse stay or on the side frame parts, and a support frame which is pivotably journalled on the load-carrying frame, that the support frame is provided with locking means designed to be brought into engagement with either the lower end frame part of the main frame to give a first position of the load-carrying member, or with a second transverse stay of the main frame part, said second stay being located above and at a predetermined distance from said first transverse stay, to give a second position of the load-carrying member.

2. Equipment according to claim 1, characterised in that the load-carrying frame comprises an outer part pivotable in relation thereto and arranged to be locked in relation to the load carrying frame to provide an extended load plane or extended support member.

3. Equipment according to claim 2, characterised in that the outer part of the load carrying frame is provided with locking means which, after the locking engagement of the outer part with the load-carrying frame has been released, can be brought into engagement with the lower end frame part of the main frame, so that a third position for the load-carrying member is obtained.

4. Equipment according to claim 2 or 3, characterised in that the outer part of the load-carrying frame is designed to abut against the lower end frame part of the main frame, whereupon the support frame of the load-carrying frame is arranged to assume a perpendicular position in relation to the load-carrying frame, the support frame of the load-carrying frame serving as a support on the ground.

* * * * *